US012741693B2

(12) United States Patent
Varga et al.

(10) Patent No.: US 12,741,693 B2
(45) Date of Patent: Sep. 22, 2026

(54) LANE KEEPING ASSIST AND A METHOD FOR ASSISTING A LANE KEEPING

(71) Applicant: Knorr-Bremse Systeme Fuer Nutzfahrzeuge GmbH, Munich (DE)

(72) Inventors: Arpad Varga, Budapest (HU); József Gergely Bene, Budapest (HU); Zoltan Gyurko, Hahot (HU); Levente Orosz, Jaszdozsa (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 140 days.

(21) Appl. No.: 18/832,321

(22) PCT Filed: Jan. 26, 2023

(86) PCT No.: PCT/EP2023/051947

§ 371 (c)(1),
(2) Date: Jul. 23, 2024

(87) PCT Pub. No.: WO2023/156165

PCT Pub. Date: Aug. 24, 2023

(65) Prior Publication Data

US 2025/0100621 A1 Mar. 27, 2025

(30) Foreign Application Priority Data

Feb. 16, 2022 (EP) .................................... 22156909

(51) Int. Cl.

*B60W 30/12* (2020.01)
*B62D 15/00* (2006.01)
*B62D 15/02* (2006.01)

(52) U.S. Cl.

CPC ................................ *B62D 15/0265* (2013.01)

(58) Field of Classification Search

CPC ............. B60W 30/12; B60W 2552/53; B60W 2554/801; B60W 2554/4041; B60W 2554/4049; B62D 15/0265

See application file for complete search history.

(56) References Cited

U.S. PATENT DOCUMENTS

2015/0149039 A1* 5/2015 Fu ........................ B62D 15/025 701/41
2019/0367023 A1* 12/2019 Kobayashi ............ B60W 30/12

(Continued)

OTHER PUBLICATIONS

International Search Report for PCT/EP2023/051947 dated Mar. 27, 2023.

*Primary Examiner* — Erick R Solis

(74) *Attorney, Agent, or Firm* — NORTON ROSE FULBRIGHT US LLP

(57) ABSTRACT

An object-based lane-keeping-assist for a vehicle, including a first sensor, a second sensor, and a lane keeping function. The first sensor determines a relative position of the vehicle with respect to a lane. The second sensor detects a position of an object in an adjacent lane. The lane keeping function keeps the vehicle around a default line in the lane. The lane-keeping-assist includes a control unit having a processor and a memory with stored instructions that, when executed on the processor, cause the following: triggering a steering intervention when a distance between a vehicle side and a trigger line is below a predetermined threshold indicating an unintended lane departure of the vehicle; completing the steering intervention, when the default travel line of the lane keeping function has been reached; and shifting the trigger line when the second sensor has detected the object in the adjacent lane.

10 Claims, 7 Drawing Sheets

(56) References Cited

U.S. PATENT DOCUMENTS

2020/0255008 A1 8/2020 Kim
2020/0391731 A1 12/2020 Cheon
2021/0155258 A1* 5/2021 Dadam ..................... F01N 9/00
2023/0029842 A1* 2/2023 Okano .................. B60W 30/12
2023/0054263 A1* 2/2023 Lin ................. B60W 30/18163
2023/0056929 A1* 2/2023 Wada ................... B60W 40/114
2023/0140569 A1* 5/2023 Foster ................. B60W 30/146
701/400
2024/0025403 A1* 1/2024 Tomioka ............. B60W 60/001
2024/0208496 A1* 6/2024 Olsson .................. B60W 30/12

* cited by examiner

LANE KEEPING ASSIST AND A METHOD FOR ASSISTING A LANE KEEPING

FIELD OF THE INVENTION

The present invention relates to an object-based lane keeping assist and a method for providing an assistance to keep a lane based on objects.

BACKGROUND INFORMATION

Vehicles are nowadays equipped with more and more assistance devices to not only support a driver, but also to increase the road safety. In particular, autonomously driven vehicle rely on various assist functions to perform various task, often even redundantly. One of these assistance devices is a lane keeping system which shall prevent an unintentional leaving of a driving lane.

However, conventional lane keeping assist functions are still error prone or may be supplemented by another or differently operating lane keeping assist to improve the traffic safety. Also for autonomous operations, there is always a demand of additional devices providing driving functions redundantly.

Therefore, there is a demand for further lane keeping assist systems.

SUMMARY OF THE INVENTION

At least some of these problems may be overcome by a lane keeping assist according to the description herein or a method according to the description herein. The further embodiments refer to further advantageous realizations of the subject matter of the main descriptions herein.

The present invention relates to an object-based lane keeping assist for a vehicle. The vehicle comprises a first sensor, a second sensor, and a lane keeping function. The first sensor is configured to determine a relative position of the vehicle with respect to a lane. The second sensor is configured to detect a position of an object in an adjacent lane. The lane keeping function is configured to keep the vehicle around a default line in the lane. The lane keeping assist comprises a control unit including a processor and a memory with stored instructions that, when executed on the processor, cause the following:

to trigger a steering intervention when a distance between a side of the vehicle and a trigger line is below a predetermined threshold indicating an unintended lane departure of the vehicle;

to complete the steering intervention, when the default travel line of the lane keeping function has been reached; and to shift the trigger line when the second sensor has detected the object in the adjacent lane.

Additionally or alternatively, the steering intervention may only be activated when the trigger line has been reached and/or may continue as long as the vehicle has not yet reached the default line. The predetermined threshold may also have a zero value, i.e. the steering intervention is actually triggered when the side of the vehicle is at or on the trigger line. After reaching the default line, the lane keeping assist can be turned off or be placed in sleep modus and does not need to be activated until the next occasion, i.e. when the vehicle again approaches the trigger line. Furthermore, the lane keeping assist can be carried out on both sides of the vehicle.

According to embodiments, the lane keeping assist may utilize a lane keeping function already available in the vehicle to further increase the safety by taking into account objects in the surrounding of the vehicle. Therefore, the lane keeping assist may provide a supplemental function to an existing lane keeping assistance system.

A person skilled in the art will understand the term of "adjacent lane(s)" as being related not to the whole lane but only within a region where objects in these lanes may cause a potential risk of collision. For example, the adjacent lane may only extend a certain distance behind the vehicle and in front. Furthermore, in a suitable coordinate system, the distance to the object can be split into a lateral distance and a longitudinal distance, wherein the term "lateral distance" may be understood as a distance between the vehicle and the object measured perpendicular to a travel direction of the vehicle. Similarly, the term "longitudinal distance" may be understood as a distance between the vehicle and the object measured in the travel direction of the vehicle. The distance to the object may be measured by sensors such as radar or LIDAR devices and may thus be split into a longitudinal portion and a lateral portion.

Optionally, the lane and the adjacent lane are separated by a lane marking line, in which case, the trigger line may be beyond the lane marking line (when viewed from the vehicle) and thus inside the adjacent lane—especially when no object is detected in the adjacent lane. Thus, the regular lane keeping function may be configured to keep the vehicle—under regular conditions—inside a given lane. Therefore, the lane keeping assist according to embodiments need not to intervene the regular operation of the lane keeping function. Only if a lane departure happens to be unintentionally, the lane keeping assist may be activated. For this, the first sensor may be configured to measure a (closest) distance to the lane marking. This closest distance can again be split into the lateral distance and a vertical distance (measured parallel to gravity).

Optionally, the stored instructions may cause, upon execution, to shift the default line in a direction opposite to the object (e.g. towards the road boundary), when the distance to the object is below a threshold or is decreasing in time. Optionally, distance may be the lateral or the actual distance and depending on this definition the threshold may be adjusted accordingly. Advantageously, the shift of the default line is such that the vehicle remains in the lane. Furthermore, the shift of the default line may be communicated to the lane keeping function so that it will not interfere with the lane keeping assist. When the distance to the object is again above the threshold, the default line may be moved to its original position. Again, the move may again be communicated to the lane keeping function (especially when it is implemented in vehicle as a separated assistance device).

The object may be on one side of the vehicle (e.g. left-hand side) and another object may be on an opposite side of the vehicle (e.g. right-hand side). Then, optionally, the stored instructions may cause, upon execution, to shift the default line in a center region (e.g. in the middle) between the object on the one side of the vehicle and the other object on the opposite side of the vehicle. The term "middle" may be defined with respect to the lateral direction, not in front or in the rear back. Again, the shift of the default line may again be communicated to the lane keeping function (especially when it is implemented in vehicle as a separated assistance device).

Optionally, the amount of shifting of the trigger line and/or of the default line may depend on at least one of the following:

- a longitudinal distance to the object,
- the lateral distance to the object,
- relative speed between the object and the vehicle,
- a speed of the vehicle,
- other dynamic or kinematic parameters determining a likelihood of a collision of the object and the vehicle (e.g. accelerations, previous behavior of the object, frequency of curves or bends),
- lane information such as a lane width or a radius of a curve,
- a type of the object (e.g. a car, a motorcycle, a bus, a utility vehicle, a bicycle),
- an obstruction at a road side (e.g. trees, road markings, crash barriers, reflector posts),
- traffic from the opposite direction,
- a traffic density.

The density of traffic may dictate an increased safety distance and thus the lane keeping assist may be activated at an early stage when compared to low traffic situations. Advantageously, the shifting of the trigger line and/or of the default line may be performed dynamically based on the mentioned parameters. It may be changed continuously to ensure a sufficient safety distance to all objects surrounding the vehicle.

It should be appreciated, embodiments do not rely on a classification of objects in the surrounding, but will take into account all present objects in a dynamical continuous way while assessing the whole traffic situation and make, based thereon, adjustments for the trigger line or the default line.

Yet another embodiment relates to a lane keeping system that includes a lane keeping function and a lane keeping assist as described before, wherein the lane keeping function is configured to keep the vehicle around a default line in the lane. Yet another embodiment relates a vehicle, in particular a utility vehicle (e.g. long-haul vehicles), with such a lane keeping system. According to further embodiments, the lane keeping assist may also be implemented in passage cars or any other kind of vehicle.

Further embodiments relate to a computer-implemented method for keeping a lane by a vehicle. The vehicle comprises again a first sensor, a second sensor, and a lane keeping function. The first sensor is configured to determine a relative position of the vehicle with respect to a lane. The second sensor is configured to detect a position of an object in an adjacent lane. The lane keeping function is configured to keep the vehicle in the lane. The method comprises:

- triggering a steering intervention when a distance between a side of the vehicle and a trigger line is below a predetermined threshold indicating an unintended lane departure of the vehicle;
- completing the steering intervention when the default travel line of the lane keeping function has been reached; and
- shifting the trigger line when the second sensor has detected the object in the adjacent lane.

This method may also be implemented in software or a computer program product. In addition, the order of steps can be different as long as the desired effect is achieved. Embodiments of the present invention can, in particular, be implemented by software or as a software module in any electronic control unit (ECU) of the vehicle. Therefore, embodiment relate also to a computer program having a program code for performing the method, when the computer program is executed on a processor. Further embodiments relate to a computer-readable storage device comprising program code for carrying out the method as described above, when the program code is executed on a data processing unit.

Advantageously, the lane keeping assist may be activated only if an object comes close to the trigger line. Hence, there is no need for continuous and permanent adjustments so that, advantageously, many unnecessary changes can be avoided. This, in turn, provides the further advantage that the lane keeping assist may also serve as backup system for an available lane keeping function that interferes more often, e.g. only based on the traffic lane marking and/or independently of other objects in the surrounding of the vehicle.

Advantageously, according to further embodiments, the shift of the default line may be bound by the condition that the vehicle shall not leave the particular lane. But this is not necessary. Instead, if the traffic safety allows it, the trigger line may be inside the adjacent lane. This will lower the number of interreferences and, in particular, may increase the safety, e.g. if an object in an opposite lane comes closer and represents a risk of collision.

Thus, embodiments provide a lane keeping assist that keeps the vehicle inside a given traffic lane in case there is a risk of an unintended lane departure while taking into account surrounding objects of the vehicle such as other vehicles in the adjacent lanes. Additionally, other traffic participants in front or behind the vehicle may likewise be taken in account for initiating steering actuations.

Advantageously, the lane keeping assist provides a safe distance to all objects around the vehicle.

Some examples of the systems and/or methods will be described in the following by way of examples only, and with respect to the accompanying figures.

BRIEF DESCRIPTIONS OF THE DRAWINGS

DETAILED DESCRIPTION

Figure 1:
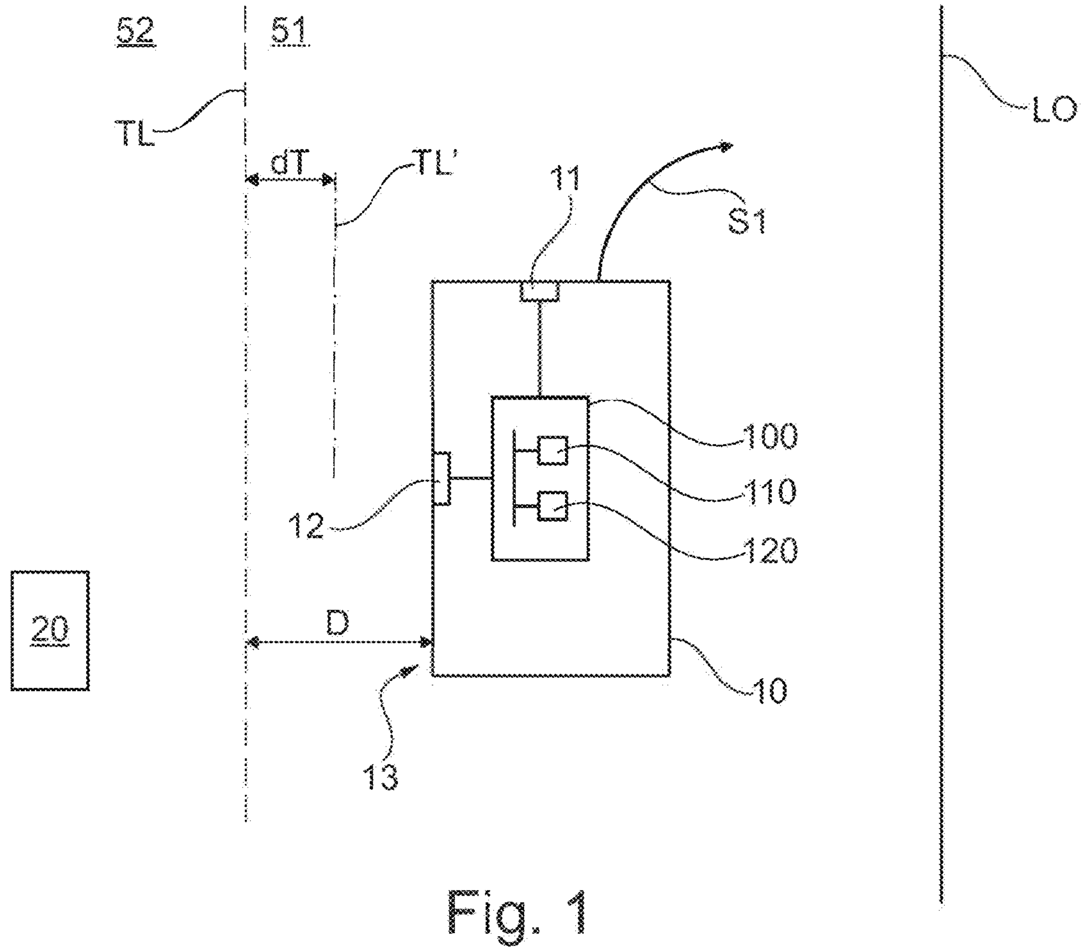
FIG. 1 depicts a lane keeping assist for a vehicle according to an embodiment of the present invention.

FIG. 1 depicts a lane keeping assist for a vehicle 10 in a traffic lane 51 which is depends on a presence of an object 20 in an adjacent lane 52. The vehicle 10 may also be called ego vehicle to distinguish it from other vehicles possibly present on the road. The vehicle 10 comprises a first sensor 11 configured to determine a relative position of the vehicle 10 with respect to a lane 51. The vehicle 10 may further comprise a second sensor 12 configured to detect a position of the object 20 in the adjacent lane 52. The vehicle may further comprise a lane keeping function which is configured to keep the vehicle 10 in the lane 51, even when no object is present. This lane keeping function may be supplemented by the lane keeping assist that may be implemented in a control unit 100 including a processor 110 and a memory

120 with stored instructions therein and which are connected (indicated by the line in the control unit 100). The instructions are configured to cause, when executed on the processor, at least the following:

- to trigger a steering intervention S1 when a distance D between a side 13 of the vehicle 10 and a trigger line TL is below a predetermined threshold indicating an unintended lane departure of the vehicle 10;
- to complete the steering intervention S1, when a default travel line L0 of the lane keeping function has been reached; and
- to shift dT the trigger line TL to a new trigger line TL', when the second sensor 12 has detected the object 20 in the adjacent lane 52.

The first sensor that is able to determine the position of the vehicle 10 may thus determine the distance D and the moment when the vehicle has reached the default line L0.

It is understood that the order of implementing the functions can be different. For example, the shift dT may be carried out before a steering interventions S1 is taken place. Similarly, it is understood that the side 13 may be right-hand side or the left-hand side of the vehicle 10 or may cover both sides.

According to embodiments, the lane keeping assist function is already present in the vehicle 10 and thus may be an additional component not being part of the lane keeping assist in the control unit 100. However, the lane keeping assist may be configured to use the available assist function, in particular to actively steer the vehicle wheels or otherwise to control the vehicle's lateral movement. Furthermore, the control may be based on a detection of road markings, crash barriers, reflector posts, lane markings or other marks that can be detected by the first sensor 11 and are suitable to improve the positional awareness of the vehicle 10 on the road.

The available lane keeping function and/or the lane keeping assist may operate continuously or intermittently or only when certain events trigger an activation. Such trigger events may be the unintended lane departure or other occasions. In general, when the vehicle 10 is at the default travel line L0 (e.g. in the middle of the original lane 51 or the road side) the intervention is completed.

The following embodiments mainly relate to situations where the road traffic in adjacent lanes travels in the same direction. However, according to further embodiments, the road traffic in the adjacent lanes may also go in opposite directions. This situation may be taken into account as another condition that determines the amount of the shift dT of the trigger line TL. For example, a larger lateral safety distance may be maintained to vehicles travelling in the opposite direction. Same applies to vehicle that represent a particular risk such as bicycles or pedestrians.

Figure 2:
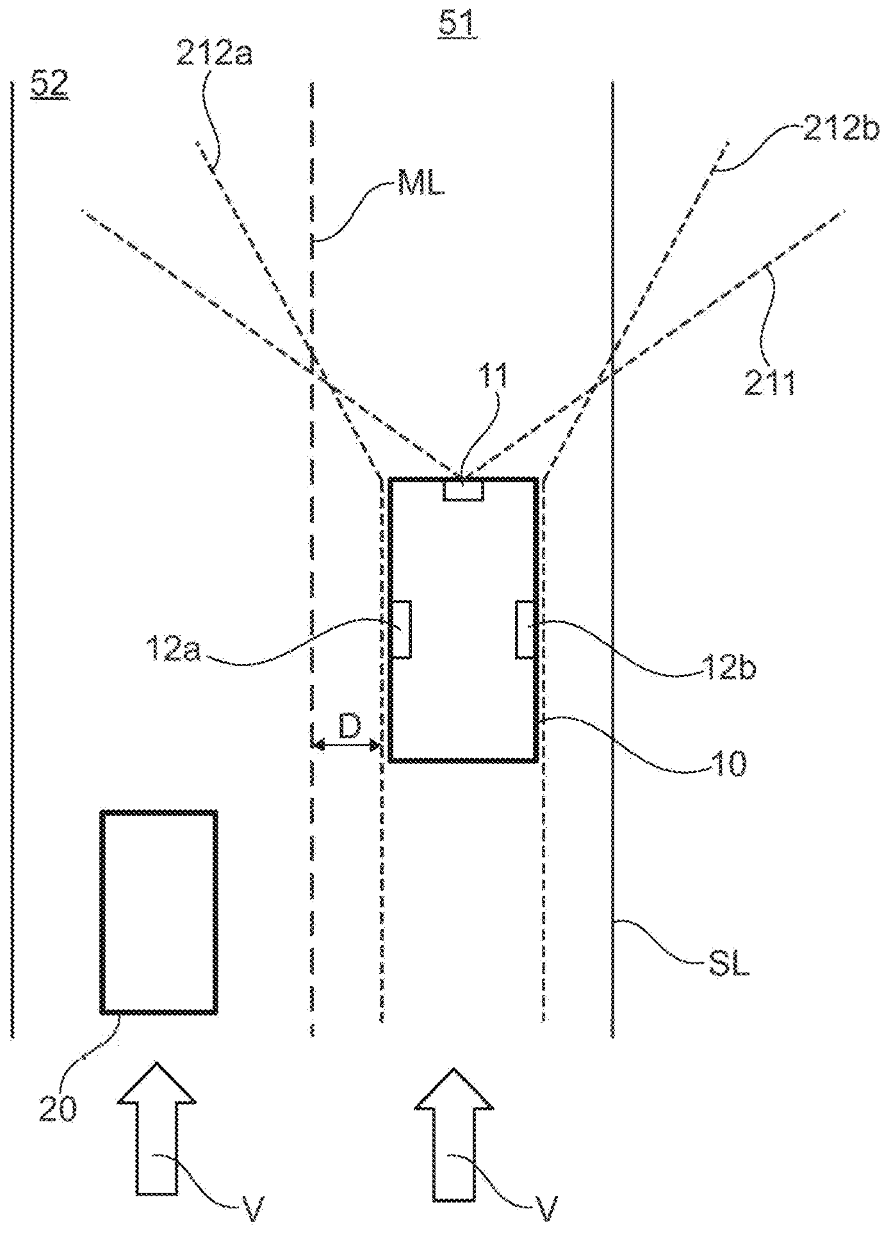
FIG. 2 illustrates the coverage areas of the different sensor devices utilized by embodiments.

FIG. 2 illustrates the coverage areas of the different sensor devices, which may be implemented in embodiments. In detail, the vehicle 10 may comprise a front looking first sensor 11 with a coverage area 211. The coverage area 211 is actually bounded by the line 211 (towards the vehicle 10) and covers the front side of the vehicle 10. In particular, it is able to detect a lane marking line ML (on either side) separating the adjacent lanes 51, 52 and/or a side line SL defining a boundary line of the road. The vehicle 10 further comprises the left looking second sensor 12*a* and a right looking second sensor 12*b*. The left looking second sensor 12*a* is mounted on the left-hand side of the vehicle 10 and has a coverage area 212*a* (beyond the dashed line). The second sensor 12*a* is able to detect other objects 20 in the adjacent lane 52 and/or in a blind spot of the vehicle 10. The right looking second sensor 12*b* has a coverage area 212*b* which again covers especially the blind spot on the right-hand side of the vehicle 10 and is able to detect any kind of objects present on the right-hand side of the vehicle 10.

In this embodiment, the vehicles 10, 20 move on a two-lane road along the same traffic direction v, possibly with different speeds. As already mentioned, the lane keeping assist can also be utilized on roads where the traffic lanes can possibly be used by oppositely directed traffic in which case an additional safety distance may be implemented.

The lane keeping assist may rely on various sensors such as cameras, radar sensors, LIDAR sensors, ultrasonic sensors etc. installed in the vehicle 10 that enable a detection of objects or marks around the vehicle, or provide even a surround view. Some of or other sensor devices may be designed for a particular purpose, for example to follow a traffic mark ML or separation lines or even detect objects or vehicles in front or in the rear of the vehicle 10.

According to further embodiments, the vehicle 10 may be equipped with multiple front-looking sensors 11 and/or multiple side-looking sensors 12, wherein at least some of them are configured to detect lane markings and/or other objects/vehicles. The side-looking sensors 12 are particularly designed to provide warnings in case objects such as other vehicles 20 are present in the blind spot and if the driver of the vehicle 10 attempts to change lane. It is understood that all these sensors are not necessarily be part of the lane keeping assist, but may be present in the vehicle 10 so that the lane keeping assist may retrieve corresponding sensor data to enable a desired positional awareness of objects and/or various marks around the vehicle 10.

It is also understood that the vehicle may be operated by a driver or autonomously with or without persons present the in vehicle.

Figure 3:
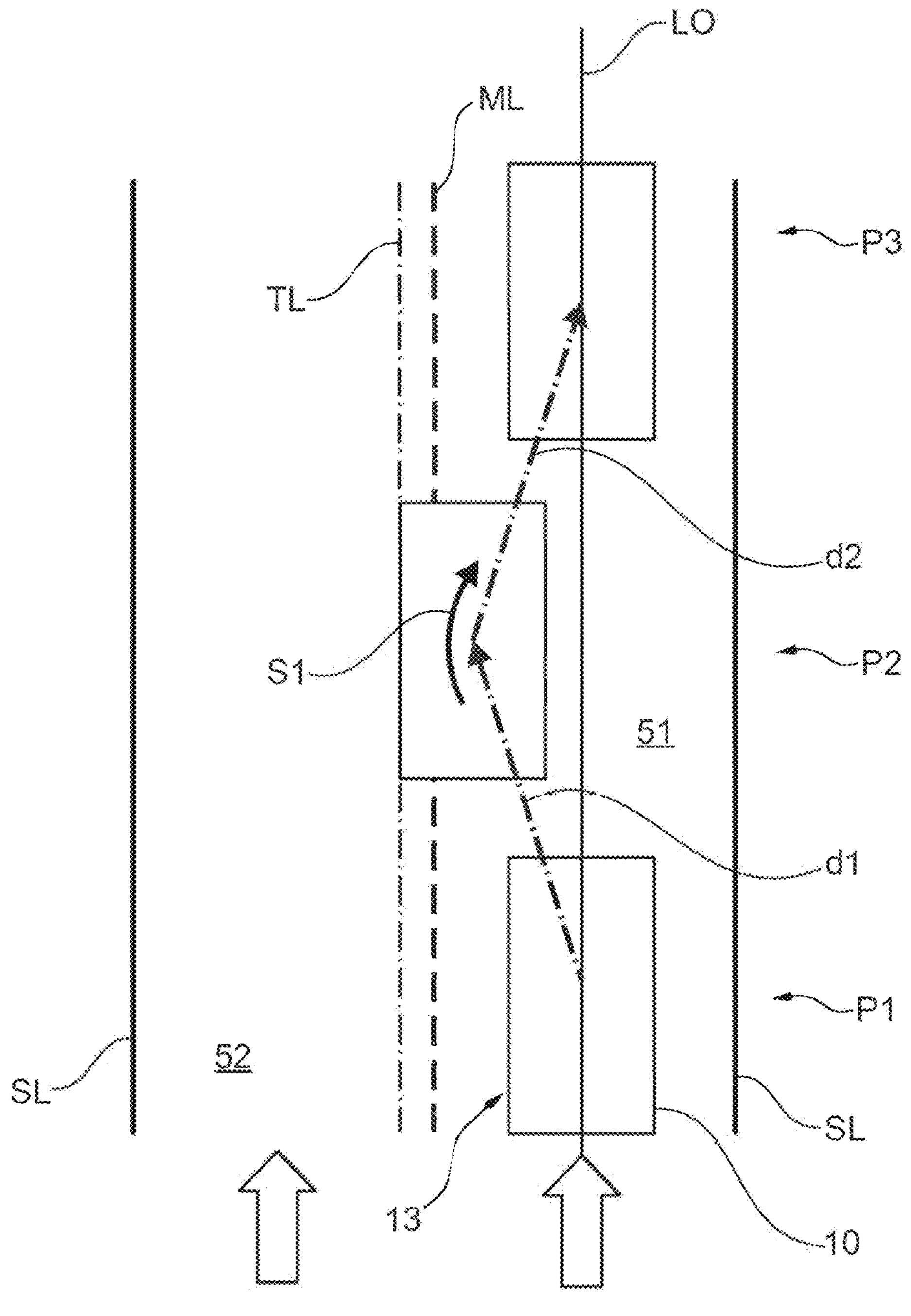
FIG. 3 illustrates embodiments when the vehicle is about to leave the lane unintentionally.

FIG. 3 shows a particular embodiment for the vehicle 10 that travels on the lane 51 and is subject to an unintended move d1 to the left-hand side. For example, in a starting position P1, the vehicle 10 is on the default line L0 defining a particular/preferred travelling path for the vehicle 10. Thereafter, at a second position P2, the vehicle 10 has reached with its left-hand side 13 the trigger line TL. The lane keeping assist will thus trigger a steering operation S1 to change the direction from the initial move d1 to a second move d2 pointing the vehicle 10 again back to the default line L0. If the vehicle reaches the default L0, at the position P3, the lane keeping assist may trigger another little steering operation to align the vehicle 10 to the default line L0. Thereafter, the lane keeping assist can be turned off or set into standby to wait for the next interference.

It is understood that the trigger line TL may be independent of the traffic mark line ML. Even if there is no traffic mark line ML, the lane keeping assist may capture both road limits SL on the left-hand side and on the right-hand side to define a trigger line TL. Depending on the traffic situation the trigger line TL may be more or less in the middle of the road and may maintain a minimum safety distance to all other objects on the road and at the road side (e.g. trees or other obstructions). Depending on the situation the trigger line TL may in particular be inside of the adjacent lane 52 (or the other half of the road). For example, if there are obstructions such as trees or other dangerous objects on the right-hand side of the road, the lane keeping assist can decide to move the trigger line TL or the default line L0 (e.g. the left) to the middle of the road or slightly further to the left to maintain a high safety for the vehicle 10. This, however, may change in the case that other objects are present in the adjacent lane 52.

Figure 4:
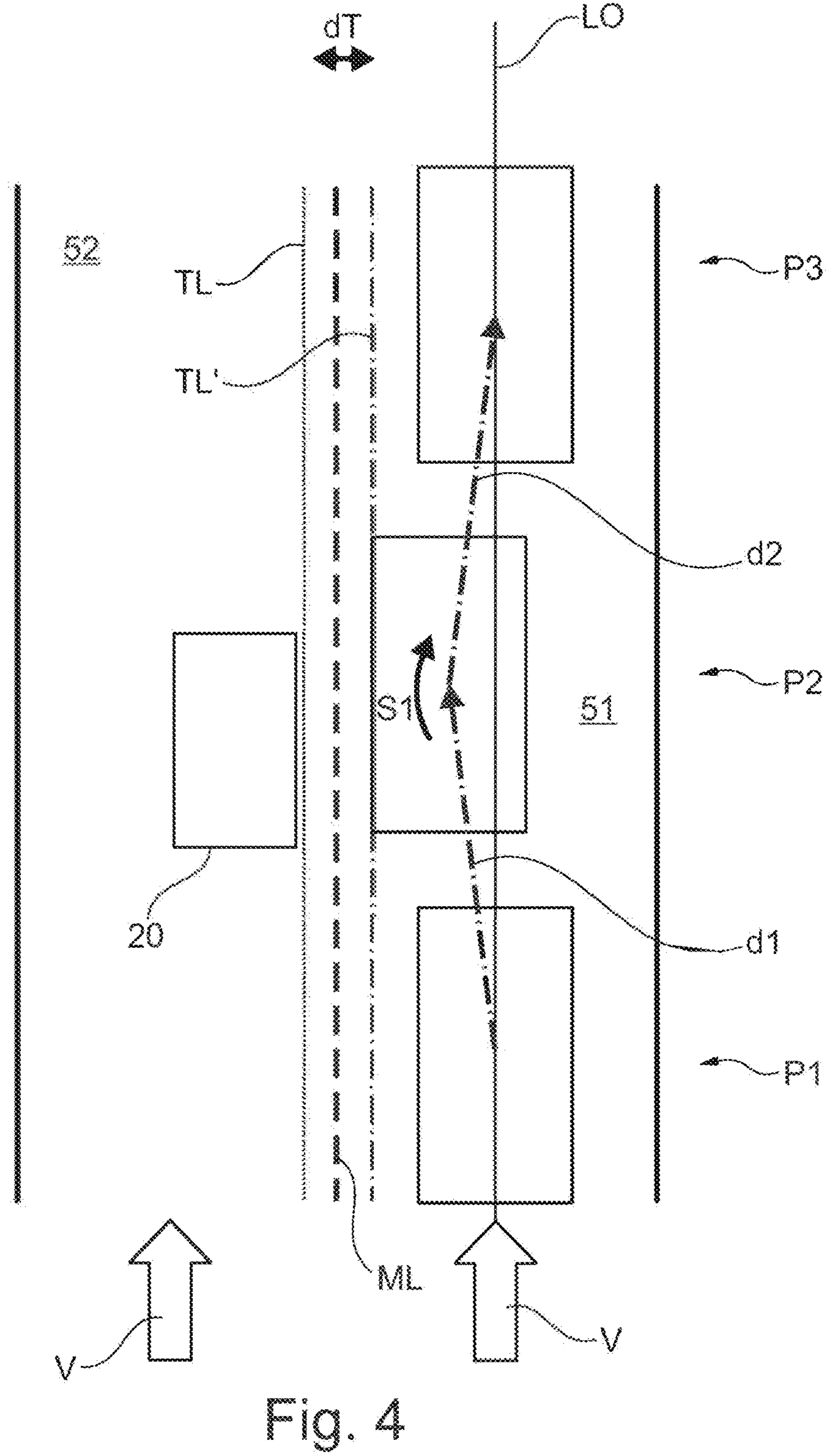
FIG. 4 illustrates embodiments when another object is present in the adjacent lane.

FIG. 4 illustrate the situation when another object 20 is present in the adjacent lane 52. This other object 20 may be another vehicle that will be detected, for example, by the left-looking second sensors 12*a* (see FIG. 2) which in turn may provide corresponding warnings. In response hereto, the lane keeping assist will, according to embodiments, perform a shift dT of the trigger line TL to a new trigger line TL' so that the new trigger line TL' is further to the right to maintain a minimum safety distance to the object 20 in the adjacent lane 52. Apart from shifting of the trigger line TL, the above described steering intervention S1 does not need to be changed. Again, if the vehicle 10 starts moving to the left along the first direction d1, and if the vehicle reaches the new trigger line TL' the steering intervention S1 will take place to move the vehicle 10 back to the default line L0 as described in FIG. 3.

Other elements shown in this figure have been described in conjunction with the other drawings. A repetition is deemed unnecessary here.

Figure 5:
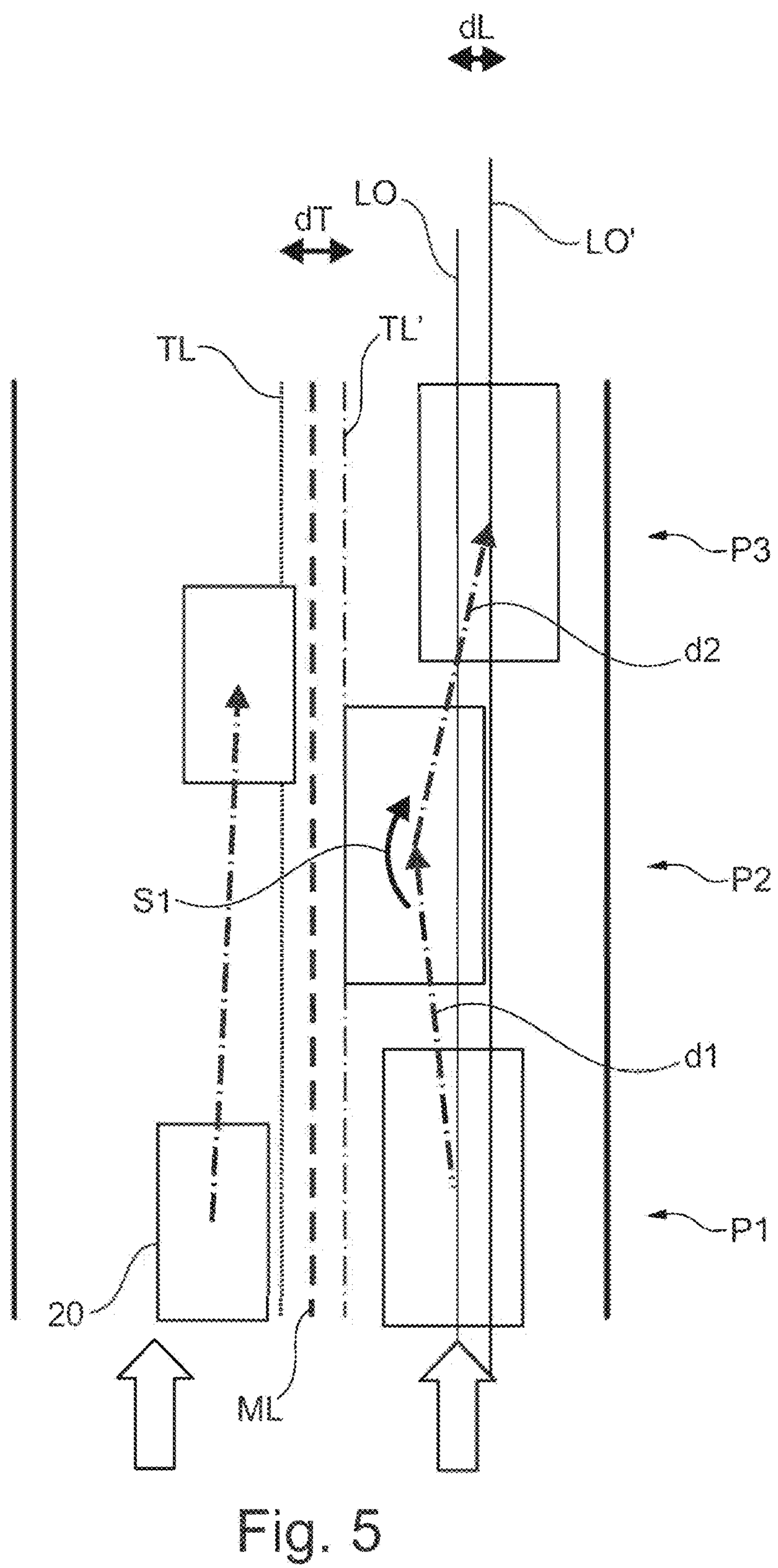
FIG. 5 illustrates another embodiment when the object in the adjacent lane moves towards the vehicle.

FIG. 5 illustrates another embodiment, wherein the object 20 in the adjacent lane 52 moves towards the vehicle 10, that means in FIG. 5 to the right. For example, the second sensors 12 will detect this movement and provides corresponding sensor data and/or warnings. The lane keeping assist is, according to embodiments, configured to monitor this movement and, in turn, may perform a shift dL of the default line L0 towards the right to increase the safety distance to the approaching object 20. In addition, or alternatively, there may also be an additional shift dT of the trigger line TL (e.g. to the right-hand side) to maintain the safety distance to the object 20. For example, the new trigger line TL' may be now truly inside the lane 51—at least as long as there is enough space on the other side of the vehicle 10.

According to embodiments, the second sensors 12 may monitor continuously the object 20 and adjust dynamically the trigger line TL and/or the default line L0. This monitoring may be performed for the whole time period where the object is within a predetermined safety region (to the rear, to the front and/or to the side), which may depend on the traffic situation (e.g. the speed of the vehicle or speed differences). In particular, the lane keeping assist may monitor the lateral position of the object 20 and/or of the vehicle 10 for the complete passing maneuver of the vehicle 10. The lateral distance to the object 20 may measure perpendicular to the moving direction (e.g. of the vehicle 10) and shall be above a lower lateral safety distance. By shifting the trigger line TL and/or the default line L0 the lane keeping assist may maintain this minimal safety distance.

Other elements shown in this figure have been described in conjunction with the other drawings. A repetition is deemed unnecessary here.

Figure 6:
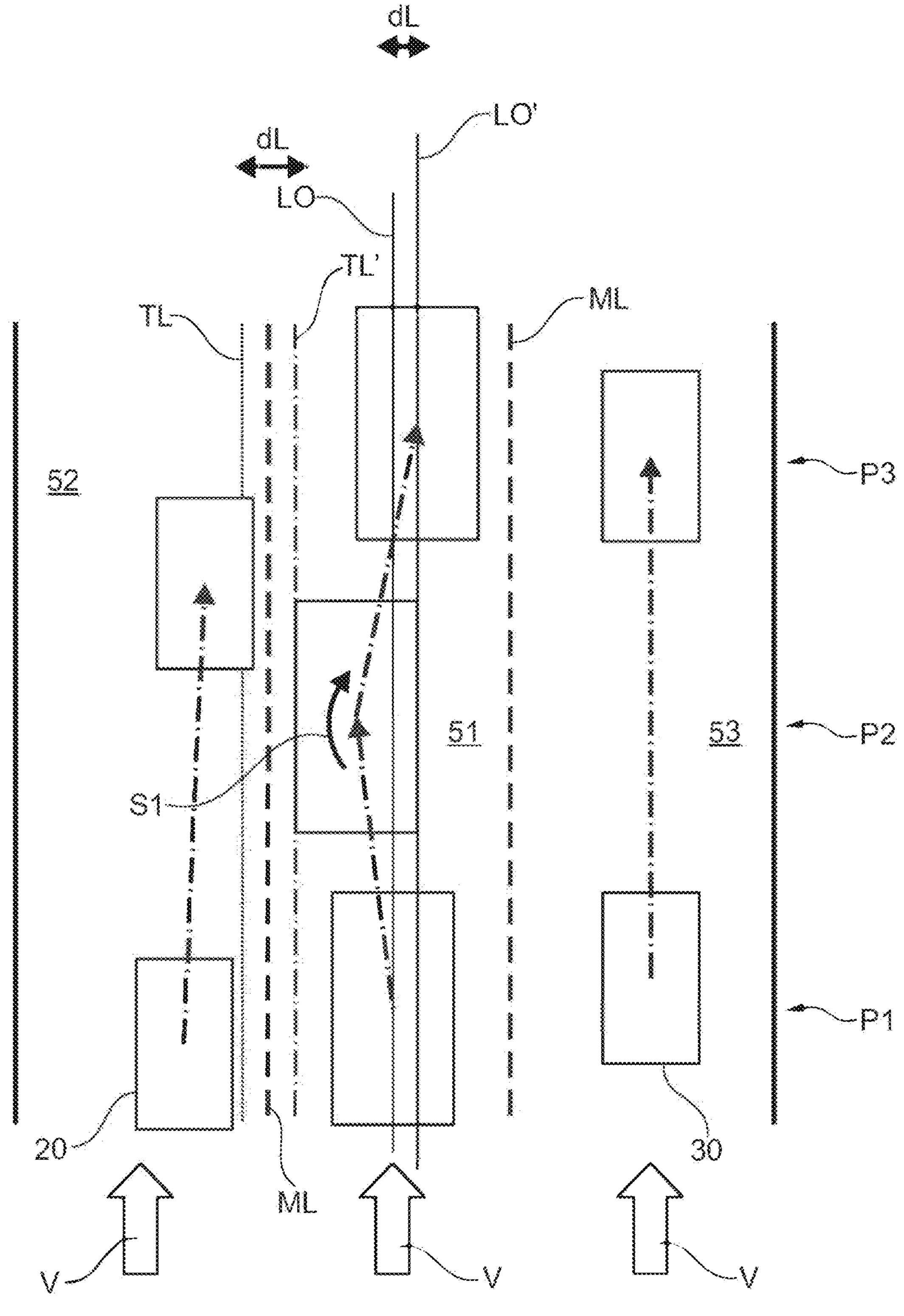
FIG. 6 illustrates yet another embodiment when the road has three traffic lanes.

FIG. 6 illustrates another embodiment for the lane keeping assist, wherein the road has three traffic lanes 51, 52, 53 and the traffic is in the same direction. The vehicle 10 may be in the middle lane 51 and the object 20 travels in lane 52 on one side of the vehicle 10. In lane 53 on the opposite side of the vehicle 10 travels another vehicle 30. For example, the vehicle 10 may pass the other vehicle 30 or the other vehicle 30 may pass the vehicle 10.

According to embodiments, the lane keeping assist is configured to adjust the minimum distances on both sides by adjusting the trigger line(s) TL and/or the default line L0 such that the vehicle 10 can keep a safe clearance to the object 20 and to the other object 30 (e.g. stays in the middle). Depending on the situation, the speed of the other object 30, the object 20 or other parameters, the adjustments of the trigger line TL and/or the default line L0 may be different.

According to embodiments, the lane keeping assist may perform a risk management in order to determine which position for the trigger line TL and/or the default line L0 may provide the lowest risk resulting in a maximum of safety. For this, for example, the sensor devices 11, 12 may monitor the objects in the adjacent lane over the time to allow an evaluation how likely it is that they will turn into the lane of the vehicle 10. Depending on this risk assessment the lane keeping assist may modify the driving direction of the vehicle 10 by moving the default line L0 while taking into account the trigger line TL on the opposite side of the vehicle (there should be enough place for travelling).

According to further embodiments, the monitoring of (all) surrounding object(s), which can move or do not move, is carried out continuously resulting in dynamic shifts of the trigger line TL and/or the default line L0. Therefore, the shifts dT, dL may be performed not only at particular moments, but continuously dependent on the situation. In other words, the trigger line(s) TL and/or the default line L0 are not necessarily (piecewise) straight lines, but may be curved lines that change in time dependent on the movement of the surrounding objects 20, 30. However, the trigger line(s) TL and/or the default line L0 may also be constant for as long as possible and are shifted only if necessarily to avoid any collision.

The lane keeping assist may be implemented only as a backup solution for an already installed lane keeping function to take into account the objects in the surrounding. The lane keeping assist may also be integrated together with the lane keeping function within a lane keeping system.

Other elements shown in this figure have been described in conjunction with the other drawings. A repetition is deemed unnecessary here.

Figure 7:
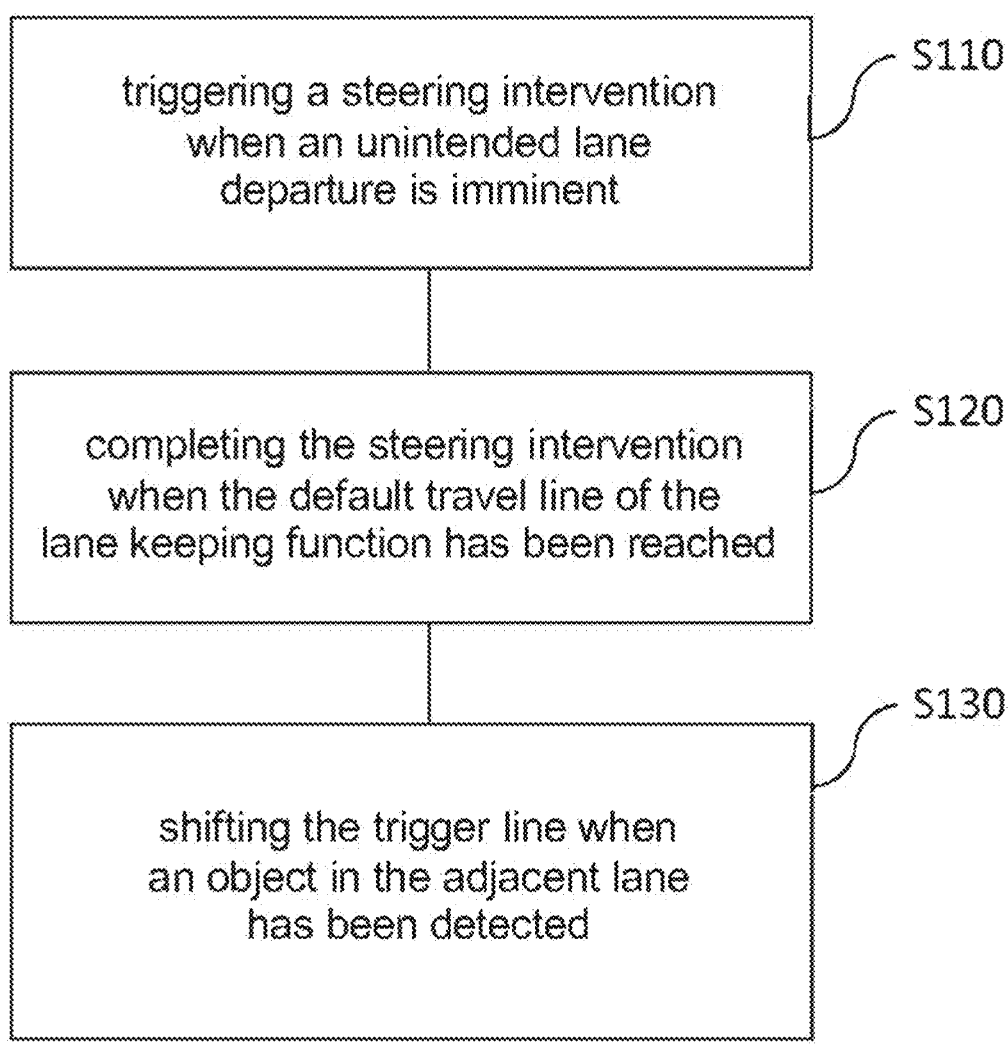
FIG. 7 depicts a schematic flow diagram for a method for keeping a lane for a vehicle.

FIG. 7 depicts a schematic flow diagram of a method for keeping a lane 51 for a vehicle 10. The method includes the steps of:

- triggering (S110) a steering intervention (S1) when a distance (D) between a side (13) of the vehicle (10) and a trigger line (TL) is below a predetermined threshold indicating an unintended lane departure of the vehicle (10);
- completing (S120) the steering intervention when the default travel line (L0) of the lane keeping function has been reached; and
- shifting (S130) the trigger line (TL) when the second sensor (12) has detected an object (20) in the adjacent lane (52).

All functions can be implemented as further optional method steps. In addition, the order of performing the various method steps may be different. Furthermore, the method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

The List of Reference Signs is as Follows

10 vehicle
11 first sensor(s)
12 second sensor(s)
13 a vehicle side
51, 52, 53 traffic lanes
20, 30 objects in adjacent lanes
100 control unit
110 processor
120 memory
v moving direction
D distance
d1,d2, . . . moves of the vehicle in different directions
S1 steering intervention
L0 default travel line
TL trigger line
SL road boundary line(s)
ML lane marking line(s)
dT shift of trigger line
dL shift of default line

The invention claimed is:

1. An object-based lane keeping assist for a vehicle, the vehicle including a first sensor, a second sensor, and a lane keeping function, the first sensor being configured to determine a relative position of the vehicle with respect to a lane, the second sensor being configured to detect a position of an object in an adjacent lane, the lane keeping function being configured to keep the vehicle around a default line in the lane, comprising:

a control unit, including a processor and a memory with stored instructions, executable on the processor, to perform the following:

triggering a steering intervention when a distance between a side of the vehicle and a trigger line is below a predetermined threshold indicating an unintended lane departure of the vehicle;

completing the steering intervention, when the default travel line of the lane keeping function has been reached; and shifting the trigger line when the second sensor has detected the object in the adjacent lane.

2. The lane keeping assist of claim 1, wherein the lane and the adjacent lane are separated by a lane marking line, and wherein the stored instructions, upon execution, further perform the following:

placing the trigger line beyond the lane marking line inside the adjacent lane, when no object is detected in the adjacent lane.

3. The lane keeping assist of claim 1, wherein the stored instructions, upon execution, further perform the following:

shifting the default line in a direction opposite to the object, when the distance to the object is below a lateral threshold or is decreasing in time.

4. The lane keeping assist of claim 3, wherein the object is on one side of the vehicle and another object is on an opposite side of the vehicle, and wherein the stored instructions, upon execution, further perform the following:

shifting the default line in a center region between the object on the one side of the vehicle and the other object on the opposite side of the vehicle.

5. The lane keeping assist of claim 3, wherein the stored instructions, upon execution, further perform the following:

communicating the shift in the default line to the lane keeping function.

6. The lane keeping assist of claim 1, wherein an amount of shifting of the trigger line and/or the default line depends on at least one of the following:

a longitudinal distance to the object,
the lateral distance to the object,
a relative speed between the object and the vehicle,
a speed of the vehicle,
other dynamic or kinematic parameters determining a likelihood of a collision of the object and the vehicle,
lane information, including a lane width or a radius of a curve,
a type of the object,
an obstruction at a road side,
traffic from an opposite direction, and/or
a traffic density.

7. The lane keeping assist of claim 1, wherein the lane keeping assist is part of a lane keeping assist system for a vehicle, the vehicle including the first sensor, the second sensor, and the lane keeping function.

8. A vehicle, which is a utility vehicle, comprising:

a lane keeping system, the vehicle including a first sensor, and a second sensor, the first sensor being configured to determine a relative position of the vehicle with respect to a lane, the second sensor being configured to detect a position of an object in an adjacent lane, comprising:

a lane keeping function configured to keep the vehicle around a default line in the lane; and a lane keeping assist, including a control unit, having a processor and a memory with stored instructions, executable by the processor, to perform the following:

triggering a steering intervention when a distance between a side of the vehicle and a trigger line is below a predetermined threshold indicating an unintended lane departure of the vehicle;

completing the steering intervention, when the default travel line of the lane keeping function has been reached; and shifting the trigger line when the second sensor has detected the object in the adjacent lane.

9. A computer-implemented method for keeping a lane for a vehicle, the vehicle including a first sensor, a second sensor, and a lane keeping function, the first sensor being configured to determine a relative position of the vehicle with respect to a lane, the second sensor being configured to detect a position of an object in an adjacent lane, the lane keeping function being configured to keep the vehicle in the lane, the method comprising:

triggering a steering intervention when a distance between a side of the vehicle and a trigger line is below a predetermined threshold indicating an unintended lane departure of the vehicle;

completing the steering intervention when the default travel line of the lane keeping function has been reached; and shifting the trigger line when the second sensor has detected the object in the adjacent lane.

10. A non-transitory computer-readable storage device having program code, which is executable by a data processing unit for performing a computer-implemented method for keeping a lane for a vehicle, the vehicle including a first sensor, a second sensor, and a lane keeping function, the first sensor being configured to determine a relative position of the vehicle with respect to a lane, the second sensor being configured to detect a position of an object in an adjacent lane, and the lane keeping function being configured to keep the vehicle around a default line in the lane, wherein the computer-implemented method includes performing the following:

triggering a steering intervention when a distance between a side of the vehicle and a trigger line is below a predetermined threshold indicating an unintended lane departure of the vehicle;

completing the steering intervention, when the default travel line of the lane keeping function has been reached; and shifting the trigger line when the second sensor has detected the object in the adjacent lane.

* * * * *